United States Patent [19]
Kelly

[11] Patent Number: 5,394,253
[45] Date of Patent: Feb. 28, 1995

[54] FLAT POLARIZING NONABSORBING BEAM SPLITTER

[76] Inventor: Shawn L. Kelly, 6423 Hollyhock Trail, Brighton, Mich. 48116

[21] Appl. No.: 43,354

[22] Filed: Apr. 6, 1993

[51] Int. Cl.⁶ .......................... G02B 5/30; G02B 5/32
[52] U.S. Cl. .................................. 359/15; 359/487; 359/494; 359/495; 359/498
[58] Field of Search ............... 359/487, 494, 495, 497, 359/498, 499, 634, 15

[56] References Cited

U.S. PATENT DOCUMENTS

| | | | |
|---|---|---|---|
| 2,887,566 | 5/1959 | Marks | 359/487 |
| 3,876,285 | 4/1975 | Schwarzmuller | 359/487 |
| 4,020,336 | 4/1977 | Linder | 359/487 |
| 4,525,413 | 6/1985 | Rogers et al. | 359/500 |
| 5,124,841 | 6/1992 | Oishi | 359/496 |
| 5,157,526 | 10/1992 | Kondo et al. | 359/487 |

FOREIGN PATENT DOCUMENTS 5019208  1/1993  Japan .................................. 359/495

OTHER PUBLICATIONS

"3M/Optical Systems Right Angle Backlighting Technology Design Aid," 3M technical literature on RAF and TRAF, pp. 1–9.

"3M/Optical Systems Solf Design Aid," 3M technical literature on Solf, pp. 1–6.

Primary Examiner—Ricky D. Shafer
Attorney, Agent, or Firm—Lyman R. Lyon

[57] ABSTRACT

A nonabsorbing polarizing optical beam splitter is described comprising a transparent substrate supporting a layer of adjacent flat beam-splitting channels. Each of the beam-splitting channels abuts respective adjacent channels at a 90° angle to form a contiguous alternating orientation relative to the substrate. Each of the beam-splitting channels reflects a first polarization component of a light beam oriented parallel to the beam-splitting channels, and allows a second remaining polarization component of the light beam to pass through the plurality of beam-splitting channels relatively unperturbed.

10 Claims, 2 Drawing Sheets

FLAT POLARIZING NONABSORBING BEAM SPLITTER

BACKGROUND OF THE INVENTION

The present invention relates generally to optical polarizers, and more particularly to a flat optical polarizing beam splitter which operates to pass a single linear polarization component of an input light beam.

Polarizers are common optical elements used generally either to separate or split two polarization states or to filter out one such state from an input beam. Many applications require such polarizers to be as flat as possible and require placement normal to the input beam to accommodate space limitations. Unfortunately, current flat polarizers placed normal to the input beam operate by absorbing the undesired polarization state. Such absorption not only prohibits alternate uses of the removed state, it also produces significant heat which restricts the performance of many high energy applications.

It is well known that two specially coated right-angle prisms, cemented along their hypotenuses, can be used to split an input beam of light into its two orthogonal linear polarization states. While such polarizing beam-splitting cubes do not suffer from the absorption of flat polarizers, they are inherently bulky and therefore occupy a large amount of beam path and add undesirable mass to the application.

SUMMARY OF THE INVENTION

It is therefore an object of the present invention to provide a flat polarizing beam splitter which does not absorb light.

It is another object of the present invention to provide a nonabsorbing optical polarizing beam splitter which does not occupy a large amount of light beam path to split an input beam of light into two orthogonal linear polarization states.

In accordance with the foregoing objects of the invention, a nonabsorbing optical polarizing beam splitter is described comprising a plurality of adjacent flat channels embedded inside or supported on the surface of a transparent optical substrate. Each of the plurality of adjacent flat channels abuts respective adjacent channels at a 90° angle to form a contiguous alternating orientation. Each of the plurality of flat channels further comprises a beam-splitting means which reflects a first polarization component of the light beam oriented parallel to the plurality of flat channels, while allowing a second remaining polarization component of the light beam to pass through the plurality of flat channels.

In further accordance with the present invention, a nonabsorbing optical polarizing beam splitter is described comprising a plurality of adjacent flat channels embedded inside or supported on the surface of a transparent optical substrate, and a plurality of flat and parallel reflective layers also embedded inside or supported on the surface of the substrate. Each neighboring pair of reflective layers abuts a common adjacent flat channel at 45° angles. Each of the plurality of flat channels comprises a beam-splitting means which reflects a first polarization component of the light beam oriented parallel to the adjacent flat channels, while allowing a second remaining polarization component of the light beam to pass through the plurality of adjacent flat channels. The plurality of parallel flat reflecting layers reflect the first polarization component back to the original reflecting one of the plurality of adjacent flat channels, which in turn reflects the first polarization component back in the general direction of the input beam.

The present invention will be more fully understood upon reading the following detailed description of the preferred embodiment in conjunction with the accompanying drawings.

DETAILED DESCRIPTION OF THE PREFERRED EMBODIMENT OF THE INVENTION

Figure 1:
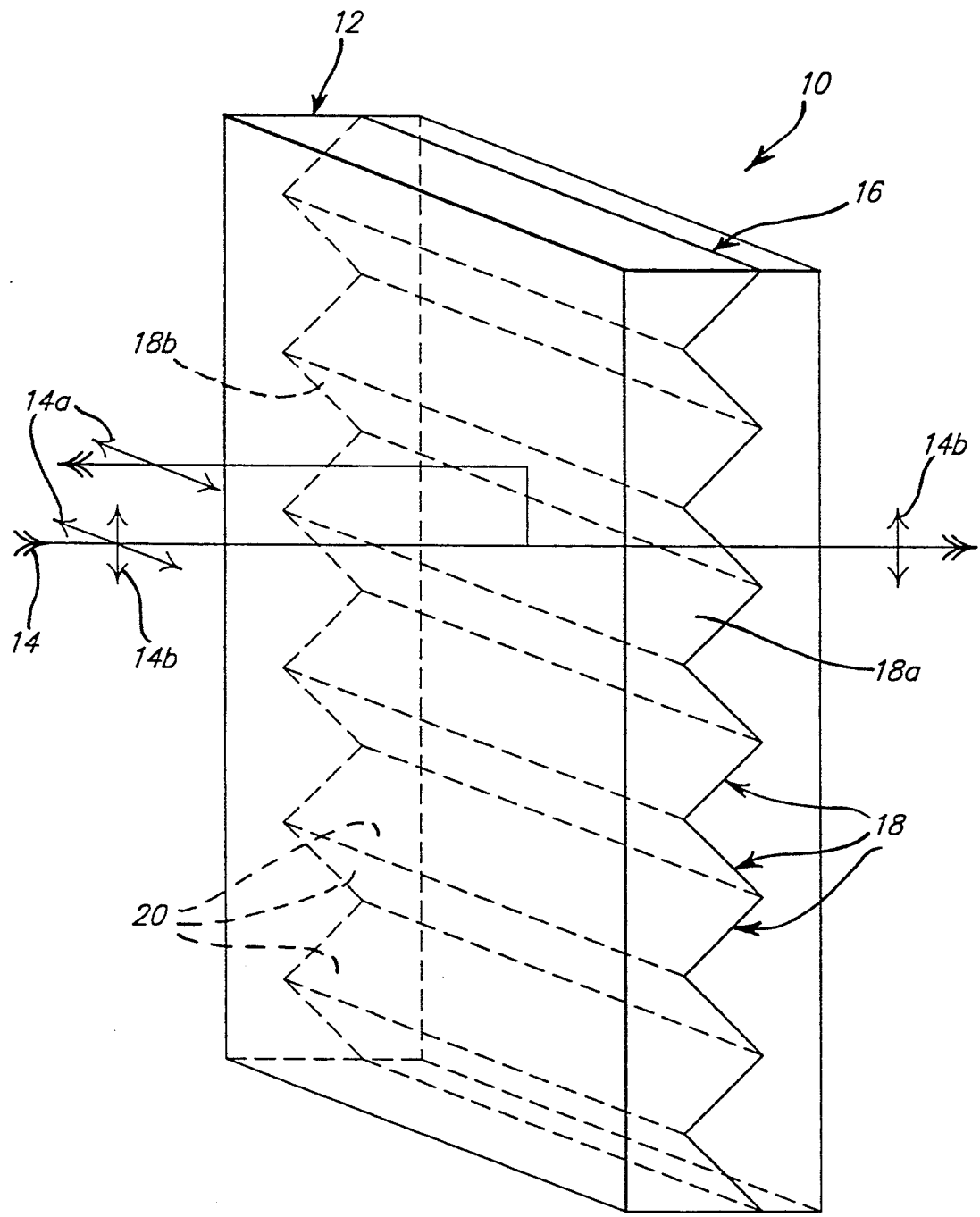
FIG. 1 schematically illustrates a first embodiment of a nonabsorbing optical polarizing beam splitter in accordance with the present invention.

Referring now to FIG. 1, a flat polarizing beam splitter 10 comprises a flat, optically transparent substrate 12 placed in and normal to the path of a randomly polarized input light beam 14. Internal to the substrate 12 is a beam-splitting layer 16 formed from a plurality of adjacent, parallel, flat beam-splitting channels 18. The respective side edges of the face surface 20 for each of the plurality of beam-splitting channels 18 are each arranged in a successively abutting relation with adjacent surfaces 20. The abutment of the edges of the surfaces 20 form 90° angles relative to respective corresponding abutting face surfaces 20. Thus, the face surfaces 20 of the plurality of beam-splitting channels 18 are arranged to form a beam-splitting layer 16 having a contiguous alternating orientation relative to the transparent substrate 12. The beam-splitting channels 18 are designed in accordance with standard principles of polarizing beam splitters.

Operation of the invention is best understood by examining the behavior of the input light beam 14 with respect to a pair of adjacent beam-splitting channels 18a and 18b. In accordance with the principles of polarizing beam spitters, an electric field component 14a of the input light beam 14 which is parallel to the surface of the beam-splitting layer 16 is reflected off channel 18a as if by a mirror onto the adjacent channel 18b, where it is again reflected in the reverse direction of the input light beam 14. The remaining orthogonally polarized component 14b of the input light beam 14 is not affected by the reflective property of the beam-splitting channel 18a and thus passes through the beam-splitting channel 18a and the substrate 12 relatively unperturbed.

The invention may be fabricated by any method as occurs to one skilled in the art. One direct approach includes micromachining or replicating an acrylic substrate having the alternating pattern of the beam-splitting channels formed thereon. The substrate and channels may then be coated with a conventional multiple metallic and/or dielectric beam-splitting stack, or they can be coated with a holographic material which is processed to provide the appropriate beam-splitting properties. To complete the sandwich form shown in FIG. 1, the beam-splitting layer 16 may then be filled with an optical resin or simply bonded to an overlaying, similarly formed, second acrylic substrate, thereby locating the beam-splitting layer 16 internal to the substrate.

However, it will be appreciated that the present invention does not require a sandwich form to achieve the desired nonabsorbing beam-splitting characteristics. A single transparent substrate having the alternating pattern of beam-splitting channels formed on the surface as described hereinabove will still provide a nonabsorbing beam-splitting function on an input light beam. In a single substrate arrangement, i.e., nonsandwich form, the nonreflected polarized light beam component does not pass straight through the substrate, but rather exits the substrate at a refracted angle.

It is further noted that the present invention may be advantageously utilized by attaching, or integrating, the polarizing nonabsorbing beam splitter with an optical element such as a lens. When incorporated into a lens, the substrate of the polarizing beam splitter will be generally curved in accordance with the surface of the lens instead of the flat arrangement described hereinabove. In accordance with the present invention, a curvature in the substrate will not significantly alter the basic function of the nonabsorbing beam splitter.

Figure 2:
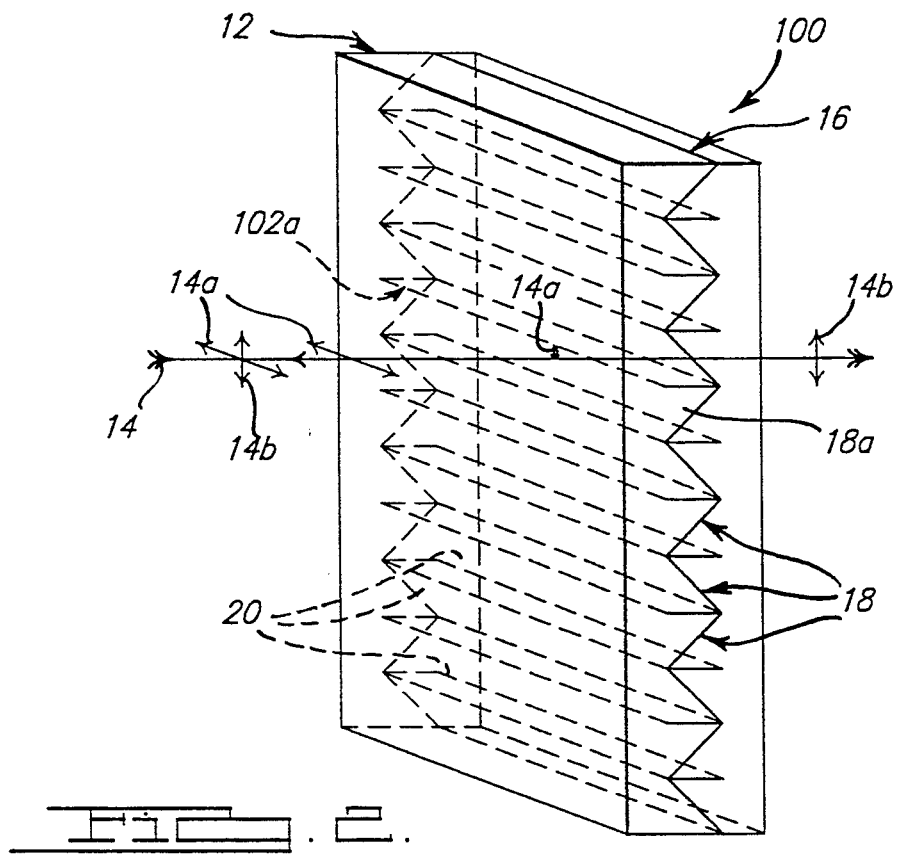
FIG. 2 schematically illustrates a second embodiment of a nonabsorbing optical polarizing beam splitter in accordance with the present invention.

Referring to FIG. 2, there is shown a flat polarizing beam splitter 100 in accordance with a second embodiment of the present invention. Beam splitter 100 incorporates all the elements of the flat polarizing beam splitter 10 previously described and shown in FIG. 1. However, beam splitter 100 further includes a flat, reflective layer 102a at the vertex of each abutting pair of beam-splitting channels 18 such that each reflective layer 102a bisects the angle of the corresponding vertex, i.e., abuts the respective pair of adjacent flat channels at a 45° angle. The plurality of flat reflective layers 102 are all aligned in a parallel relation.

In the operation of the flat polarizing beam splitter 100, the input light beam 14 is first split into two orthogonal polarizations by a first encounter with the beam-splitting channel 18a in a like manner as described with respect to FIG. 1. In the present embodiment however, the reflected component 14a is again reflected by the reflective layer 102a back to the originally encountered beam-splitting channel 18a. Beam-splitting channel 18a subsequently reflects the polarized light component 14a back along the original input light path in a reverse direction as shown in FIG. 2. The advantage of flat polarizing beam splitter 100 is that the beam exiting the invention counter-parallel to the input beam is not as significantly displaced with respect to the input beam. This advantage may be significantly important in some applications to compensate for the greater difficulty of fabrication.

Figure 3:
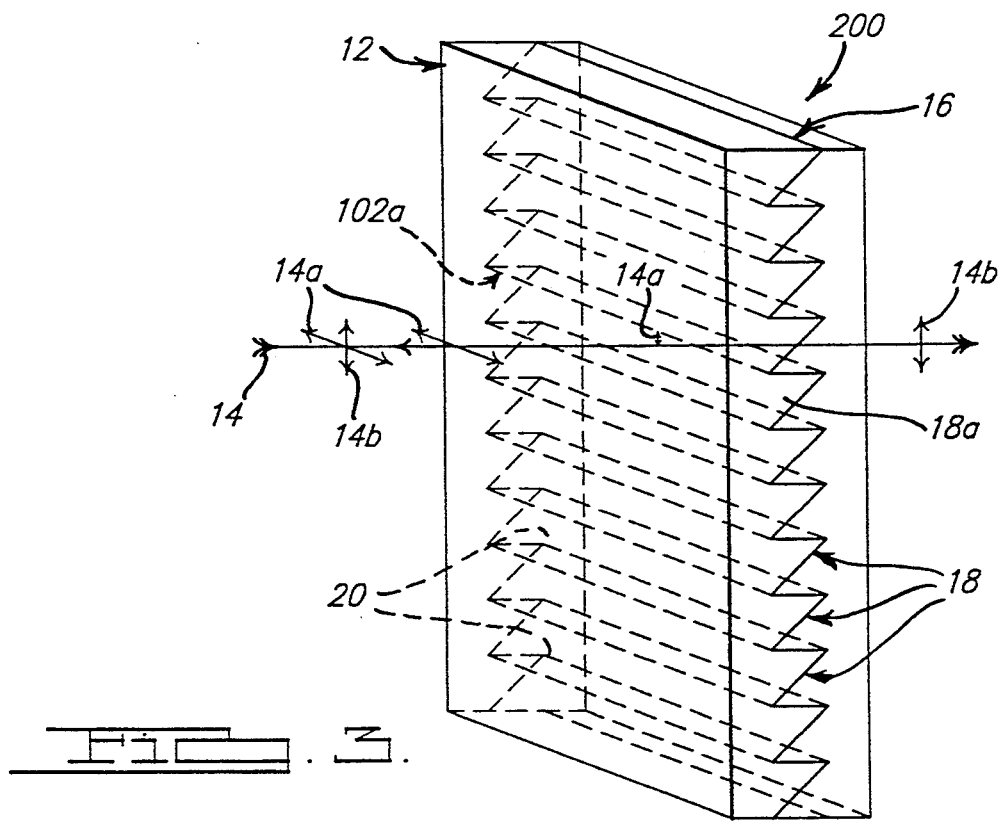
FIG. 3 schematically illustrates an alternative arrangement of the nonabsorbing optical beam splitter shown in FIG. 2.

Referring to FIG. 3, there is shown an alternative arrangement flat polarizing beam splitter 200 which operates in the same manner as the above described flat polarizing beam splitter 100 shown in FIG. 2. However, the face surfaces 20 of the plurality of beam-splitting channels 18 are all further oriented parallel to the same angle relative to the transparent substrate 12, rather than the contiguous alternating orientation utilized in both FIGS. 1 and 2. More specifically, the plurality of beam-splitting channels 18 are all further oriented to a 45° angle relative to the input light beam path. Each of the plurality of reflecting layers 102a abuts a respective pair of adjacent parallel beam-splitting channels 18 so as to be aligned parallel to the input beam. Orienting the beam-splitting channels 18 to the same angle relative to the substrate 12 and light beam path may reduce the overall complexity involved in manufacturing beam splitter 200.

The invention therefore provides a flat polarizing beam splitter which transmits one linear polarization state and reflects the orthogonal state with negligible absorption of light. It is understood that modifications to the invention might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

What is claimed is:

1. A nonabsorbing optical polarizing beam splitter comprising:

a transparent substrate located in a light beam path;

a plurality of adjacent flat channels supported by said substrate, each of said plurality of flat channels abutting respective adjacent channels at approximately a 90° angle to form a contiguous alternating orientation relative to the light beam path, wherein each of said plurality of adjacent flat channels comprises a means for splitting a light beam which reflects a first polarization component of the light beam oriented parallel to said plurality of channels, while allowing a second polarization component of the light beam to pass through said plurality of adjacent flat channels; and a plurality of parallel flat reflecting layers supported by the substrate, each of said plurality of flat reflecting layers abutting a respective pair of said plurality of adjacent flat channels at a 45° angle, each of said plurality of reflecting layers reflecting the first polarization component back to the original reflecting one of said plurality of adjacent flat channels, which in turn reflects the first polarization component back in the direction of the light beam path.

2. The nonabsorbing optical polarizing beam splitter of claim 1 wherein said beam-splitting means comprises coating said plurality of flat channels with a multiple layer dielectric and/or metallic stack.

3. The nonabsorbing optical polarizing beam splitter of claim 1 wherein said beam-splitting means comprises coating said plurality of channels with a holographic material.

4. The nonabsorbing optical polarizing beam splitter of claim 1 wherein said plurality of adjacent flat channels are located within said substrate.

5. The nonabsorbing optical polarizing beam splitter of claim 1 wherein said plurality of adjacent flat channels are located on the surface of said substrate.

6. A nonabsorbing optical polarizing beam splitter comprising:

a transparent substrate located in a light beam path;

a plurality of parallel flat channels supported by said substrate; and a plurality of parallel flat reflective layers supported by said substrate, each of said plurality of parallel flat reflective layers abutting a respective pair of said plurality of parallel flat channels at a 45° angle, wherein each of said plurality of parallel flat channels comprises a means for splitting a light beam which reflects a first polarization component of the light beam oriented parallel to said plurality of parallel flat channels to a respective one of said plurality of parallel flat reflective layers, while allowing a second polarization component of the light beam to pass through said plurality of parallel flat channels, said plurality of parallel flat reflecting layers reflecting the first polarization component back to the original reflecting one of said plurality of parallel flat channels, which in turn reflects the first polarization component back in the direction of the light beam path.

7. The nonabsorbing optical polarizing beam splitter of claims 6 wherein said beam-splitting means comprises coating said plurality of flat channels with a multiple layer dielectric and/or metallic stack.

8. The nonabsorbing optical polarizing beam splitter of claim 6 wherein said beam-splitting means comprises coating said plurality of channels with a holographic material.

9. The nonabsorbing optical polarizing beam splitter of claim 6 wherein said plurality of adjacent flat channels are located within said substrate.

10. The nonabsorbing optical polarizing beam splitter of claim 6 wherein said plurality of adjacent flat channels are located on the surface of said substrate.

* * * * *